US010453118B2

(12) United States Patent
Smith et al.

(10) Patent No.: US 10,453,118 B2
(45) Date of Patent: Oct. 22, 2019

(54) CUSTOM USER DEFINABLE KEYWORD BIDDING SYSTEM AND METHOD

(75) Inventors: Kevin Smith, Pleasant Grove, UT (US); Dipendra Malhotra, Princeton, NJ (US)

(73) Assignee: Adobe Inc., San Jose, CA (US)

( * ) Notice: Subject to any disclaimer, the term of this patent is extended or adjusted under 35 U.S.C. 154(b) by 316 days.

(21) Appl. No.: 13/533,822

(22) Filed: Jun. 26, 2012

(65) Prior Publication Data

US 2012/0303465 A1 Nov. 29, 2012

Related U.S. Application Data

(63) Continuation of application No. 11/510,064, filed on Aug. 24, 2006, now Pat. No. 8,219,457.

(60) Provisional application No. 60/731,159, filed on Oct. 28, 2005.

(51) Int. Cl.
*G06Q 30/08* (2012.01)
*G06Q 30/02* (2012.01)
*G06Q 30/06* (2012.01)
*G06Q 40/04* (2012.01)

(52) U.S. Cl.
CPC ............ *G06Q 30/08* (2013.01); *G06Q 30/02* (2013.01); *G06Q 30/0241* (2013.01); *G06Q 30/0242* (2013.01); *G06Q 30/0275* (2013.01); *G06Q 30/0601* (2013.01); *G06Q 40/04* (2013.01)

(58) Field of Classification Search
CPC ...................................................... G06Q 30/08
See application file for complete search history.

(56) References Cited

U.S. PATENT DOCUMENTS

| 6,421,675 | B1 | 7/2002 | Ryan et al. |
| 6,721,713 | B1 * | 4/2004 | Guheen ................. G06Q 50/01 705/1.1 |
| 7,043,450 | B2 | 5/2006 | Velez et al. |
| 7,117,202 | B1 | 10/2006 | Willoughby |
| 7,155,267 | B2 * | 12/2006 | Lee ........................ H04B 1/005 455/575.7 |
| 7,225,151 | B1 | 5/2007 | Konia |
| 7,240,077 | B1 * | 7/2007 | Edelman et al. |

(Continued)

FOREIGN PATENT DOCUMENTS

JP 2003296629 10/2003

OTHER PUBLICATIONS

Office Action from Japanese Patent Application No. P2008-537963, dated Oct. 11, 2011, English Translation and Japanese Version, Adobe Systems Incorporated, all pages.

(Continued)

*Primary Examiner* — Bruce I Ebersman
(74) *Attorney, Agent, or Firm* — Kilpatrick Townsend & Stockton LLP

(57) ABSTRACT

A system and method allow a user or business entity to create customized rules for bidding on keywords to/from a search engine. A bid automation engine allows a user or business entity to specify a number of rules for bidding on keywords used in Internet advertising campaigns. The bid automation engine may be part of, or interface with, a web analytics tool and/or a bid management system to provide user-defined strategies for bidding on keywords. Accordingly, a user or business entity may set up a customized bidding strategy for keywords by building sets of bidding rules.

21 Claims, 11 Drawing Sheets

(56) References Cited

U.S. PATENT DOCUMENTS

| | | | |
|---|---|---|---|
| 7,281,042 B2 | 10/2007 | Hsu et al. | |
| 7,315,826 B1 * | 1/2008 | Guheen | G06Q 10/06 705/7.29 |
| 7,444,314 B2 | 10/2008 | Rouvellou et al. | |
| 7,444,358 B2 | 10/2008 | Paczkowski et al. | |
| 7,548,915 B2 | 6/2009 | Ramer et al. | |
| 7,571,155 B2 | 8/2009 | Choi et al. | |
| 7,649,838 B2 | 1/2010 | Fishteyn et al. | |
| 7,716,077 B1 * | 5/2010 | Mikurak | G06Q 10/06 705/7.12 |
| 7,788,159 B1 * | 8/2010 | Sack | 705/37 |
| 8,095,523 B2 | 1/2012 | Brave et al. | |
| 2001/0042064 A1 | 11/2001 | Davis et al. | |
| 2002/0165849 A1 | 11/2002 | Singh et al. | |
| 2003/0033292 A1 | 2/2003 | Meisel et al. | |
| 2003/0088525 A1 | 5/2003 | Velez et al. | |
| 2003/0101126 A1 | 5/2003 | Cheung et al. | |
| 2003/0105677 A1 * | 6/2003 | Skinner | 705/26 |
| 2003/0212648 A1 | 11/2003 | Cunningham et al. | |
| 2004/0088241 A1 * | 5/2004 | Rebane et al. | 705/37 |
| 2004/0107137 A1 | 6/2004 | Skinner | |
| 2005/0044003 A1 * | 2/2005 | O'Keeffe et al. | 705/26 |
| 2005/0076132 A1 * | 4/2005 | Roberts | G06Q 30/02 709/228 |
| 2005/0144064 A1 | 6/2005 | Calabria et al. | |
| 2005/0209953 A1 | 9/2005 | Stubbs et al. | |
| 2005/0262240 A1 * | 11/2005 | Drees et al. | 709/224 |
| 2006/0026064 A1 * | 2/2006 | Collins | 705/14 |
| 2006/0074747 A1 * | 4/2006 | Kline et al. | 705/14 |
| 2006/0074749 A1 | 4/2006 | Kline et al. | |
| 2006/0224496 A1 | 10/2006 | Sandholm et al. | |
| 2006/0229938 A1 | 10/2006 | Yan | |
| 2006/0282314 A1 | 12/2006 | Zamanian et al. | |
| 2007/0027754 A1 * | 2/2007 | Collins et al. | 705/14 |
| 2007/0100708 A1 | 5/2007 | Smith et al. | |
| 2008/0183664 A1 | 7/2008 | Cancel et al. | |
| 2008/0196098 A1 * | 8/2008 | Cottrell | H04L 63/0414 726/12 |
| 2010/0030894 A1 * | 2/2010 | Cancel | G06Q 10/04 709/224 |

OTHER PUBLICATIONS

European Search Report from Application No./Patent No. 06826801. 0-1238 / 1952325 (PCT/US2006041893), dated Apr. 23, 2010, 7 pages.

PCT International Search Report and Written Opinion, PCT/US06/41893, dated Jul. 24, 2007, 8 pages.

"Atlas DMT Enhances Proprietary Automated Search Engine Marketing Optimization Took; Added Capabilities to CaompaignOptimizer Delivers Increased ROI," Aug. 3, 2004, Business Wire [online] [retrieved on Aug. 24, 2006 from the Internet <URL:http://findarticles.com/p/articles/mi_m0EIN/is_2004_August_3/ai_n6139142>.

"Go Toast Unveils CampaignOptimizer," Nov. 3, 2003, Business Wire, [online] [Retrieved on Aug. 24, 2005] Retrieved from the Internet <URL:http://findarticles.com/p/articles/mi_m0EIN/is_2003_Nov_3/ai_109558969>.

"Go Toast Unveils "Power Rules": New Rule Group Provides Optimum ROI Conversion Management," Aug. 18, 2003, Business Wire, [online] [Retrieved on Aug. 24, 2005] Retrieved from the Internet <URL:http://findarticles.com/p/articles/mi_m0EIN/is_2003_August_18/ai_106643685>.

Ron Kohavi, et al., "Ten Supplementary Analyses to Improve E-commerce Web Sites," 2003, http://en.scientificcommons.org/43024765; 2003, 8 pages.

B. Eisenberg, The Marketer's Common Sense Guide to E-Metrics, http://download.netiq.com/CMS/WHITEPAPER/NetIQ_WP_WRC_MarketersGuidetoEMetrics,pdf; 2002, 78 pages.

* cited by examiner

FIGURE 2

Business Rule Manager

*Bid Automation using SearchCenter's Business Rules allows you to automatically adjust and optimize your keywords' CPC position. Select from several prepackaged rules or create custom rules based on your custom events and calculated.*

⊞ Google

| Rule | Managed Keywords | Manage |
|---|---|---|
| CTR Stabilizer | 237 | ✎ ✗ |
| CTR -Stabilisierer | 193 | ✎ ✗ |
| day-part cpc | 0 | ✎ ✗ |
| day-part cpc – SC Demo | 0 | ✎ ✗ |
| Disable Keyword – CTR based | 0 | ✎ ✗ |
| Disable Keyword – ROAS based | 0 | ✎ ✗ |
| Get Position 2 | 0 | ✎ ✗ |
| Localization test | 0 | ✎ ✗ |
| ROAS -Stabilisierer | 0 | ✎ ✗ |

[Add New Rule]

⊞ YAHOO!

| Rule | Managed Keywords | Manage |
|---|---|---|
| caboose | 0 | ✎ ✗ |
| CTR Stabilizer | 0 | ✎ ✗ |
| Custom Bid Rule Test | 0 | ✎ ✗ |
| Day Parting Strategy for Max CPC | 0 | ✎ ✗ |
| Disable Keyword – CTR based | 0 | ✎ ✗ |
| Disable Keyword – ROAS based | 0 | ✎ ✗ |
| Minimum Bid | 1 | ✎ ✗ |
| Position Holder | 0 | ✎ ✗ |

CUSTOM USER DEFINABLE KEYWORD BIDDING SYSTEM AND METHOD

CROSS-REFERENCE TO RELATED APPLICATIONS

The present application is a continuation of U.S. patent application Ser. No. 14/510,064, filed Aug. 24, 2006, now U.S. Pat. No. 8,219,457, which claims priority to U.S. Provisional Patent Application No. 60/731,159, filed Oct. 28, 2005, which are incorporated herein by reference in their entireties.

BACKGROUND

The rapid growth in accessibility and use of the Internet has drawn an increasing number of businesses into using the Internet as a vehicle to attract potential customers. In many cases, businesses are relying on the Internet as their sole or primary marketing and advertising conduit. It is now commonplace for online and "brick-and-mortar" businesses to contract with search engines in an effort to direct search engine users to the businesses. Such relationships generally revolve around the use of keywords (or key phrases), the rights to which are purchased from search engines by businesses, in response to which the search engines conspicuously display advertising associated with the businesses when a user inputs the particular purchased keywords. For example, a shoe company may purchase the keyword "sandal" from a search engine, so that when a user inputs "sandal" in the search engine, the search engine prominently displays a link to the shoe company or advertising associated therewith.

The pricing of keywords can vary depending on any one or more of a number of factors including, but not limited to, the demand for a particular keyword (the more sought a keyword is, the higher its value), the number of searches including particular keywords, time of usage for keywords, and ad position. Further, the cost of a particular keyword may be fixed, or the cost may depend on the number of users that click on an advertising link returned in response to a search of the keyword. The amount of money a business spends on online advertising is referred to in the art as "ad-spend", and the general goal of businesses advertising on the Internet is to minimize ad-spend and maximize not necessarily traffic through their website, but revenue generated from that traffic.

It is not uncommon for businesses keen on online advertising to purchase hundreds or thousands of keywords from one or more search engines. Typically, the management of such large numbers of keywords is performed manually with human users actually inputting the keywords. For example, keywords are currently managed using any one of a number of spreadsheet (e.g., Excel® by Microsoft Corporation) or document formats (e.g., Word® by Microsoft Corporation). Users generally list the keywords in a spreadsheet or document and then convert the document such that the keywords are listed in a format that is convertible and uploadable to a search engine. As indicated above, large advertising campaigns can have tens of thousands of keywords as part of an Internet marketing strategy. Therefore, those skilled in the art will note that such manual management of keywords can be cumbersome and prone to error.

Due to the demand and competition for various keywords, businesses often have to bid for keywords. Search engines generally provide rudimentary instructions for bidding on keywords. There are also a small number of predefined bidding strategies. Such strategies have been encoded by some bid management systems to, for example, maintain a position with regard to a keyword, maintain relative pricing as to a competitor or uniform resource locator (URL), and set bidding by time. However, as there are very few pre-defined bidding strategies, with so many different types of businesses, many bidding strategies may not be applicable to a large number of businesses.

Further, as described above, many businesses manage thousands or tens of thousands of keywords. Each may be associated with a single advertising campaign or multiple advertising campaigns. With such a great number of keywords, it is difficult to fit all of them with one of a very limited number of bidding strategies. Thus, there is at least a need for a system that provides flexibility so that a user or business entity is able to custom design bidding rules or strategies according to their needs and objectives.

SUMMARY

According to at least one aspect of one or more embodiments of the present invention, a computer-implemented method of keyword bidding for Internet advertising includes: enabling a user to define a keyword condition to be met in order for a rule to be triggered; and enabling a user to define an action to be taken when the rule is triggered, where the action results in bidding for the keyword according to a selection by the user.

According to at least one other aspect of one or more embodiments of the present invention, a system for customized keyword bidding for Internet advertising includes: a bid automation tool arranged to allow a user to customize at least one rule for bidding on a keyword; a hid management system operatively connected to the bid automation tool and arranged to perform keyword bidding with a search engine; and a web analytics tool operatively connected to the bid automation tool and arranged to validate the customized bidding rule.

According to at least one other aspect of one or more embodiments of the present invention, a computer-readable medium having instructions stored therein and that are executable by a processor to: enable a user to define a keyword condition to be met in order for a rule to be triggered, the keyword being used for Internet advertising; and enable a user to define an action to be taken when the rule is triggered, wherein the action results in bidding for the keyword according to a selection by the user.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

BRIEF DESCRIPTION OF DRAWINGS

FIG. 2 shows a business rule manager user interface in accordance with an embodiment of the present invention.

FIG. 3 shows a business rule manager user interface in accordance with an embodiment of the present invention.

FIG. 4 shows a business rule manager user interface in accordance with an embodiment of the present invention.

FIG. 6 shows a business rule manager user interface in accordance with an embodiment of the present invention.

FIG. 8 shows a special events user interface in accordance with an embodiment of the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

Embodiments of the present invention generally relate to a system and/or method for allowing a user or business entity to create customized rules for bidding on keywords to/from a search engine. In one or more embodiments, a bid automation engine allows a user or business entity to specify a number of rules for bidding on keywords used in Internet advertising campaigns. The bid automation engine is part of, or interfaces with, a web analytics tool (e.g., SiteCatalyst by Omniture, Inc.) and/or a bid management system (e.g., SearchCenter by Omniture, Inc.) to provide user-defined strategies for bidding on keywords. One or more embodiments allow a user or business entity to set up a customized bidding strategy for keywords by building sets of bidding rules.

Further, one or more embodiments allow a user or business entity to define one or more libraries of customized bidding rules. Thus, the user or business entity is able to create multiple libraries of different rules to manage thousands of keywords. Because the bidding rules are customizable, the rules may be modified based on performance data provided by the web analytics tool. Accordingly, by using an iterative process that includes modifying the custom bidding rules and bidding strategies, users and/or business entities are able to maximize the web traffic that is driven to their websites due to keyword purchasing.

Figure 1:
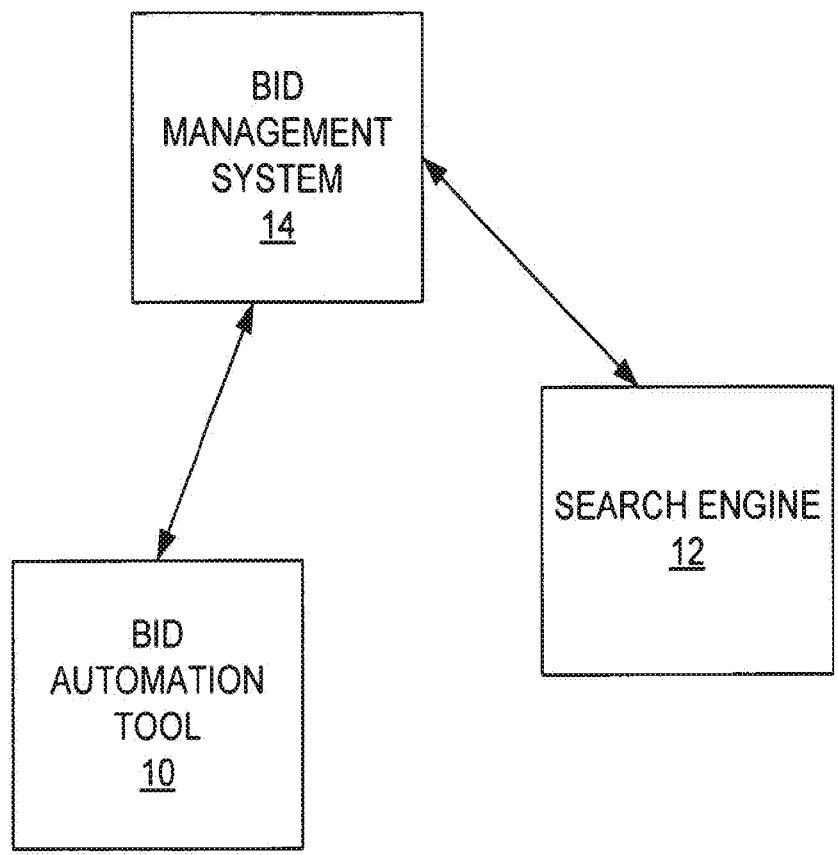
FIG. 1 shows a system in accordance with an embodiment of the present invention.

As shown in FIG. 1, a bid automation tool 10 is operatively connected to a search engine 12 and a bid management system 14. The bid automation tool 10, via data exchange with the search engine 12 and the bid management system 14, provides a user interface (UI) accessible to create bid rules for keywords. An example of such a user interface is shown in FIG. 2.

Rules may be thought of as building blocks of a bidding strategy. In one or more embodiments, there may be predefined rules and custom rules. A rule library may list these rules and their descriptions in a simple manner and provides links to edit, delete, or create new custom rules.

Figure 2:
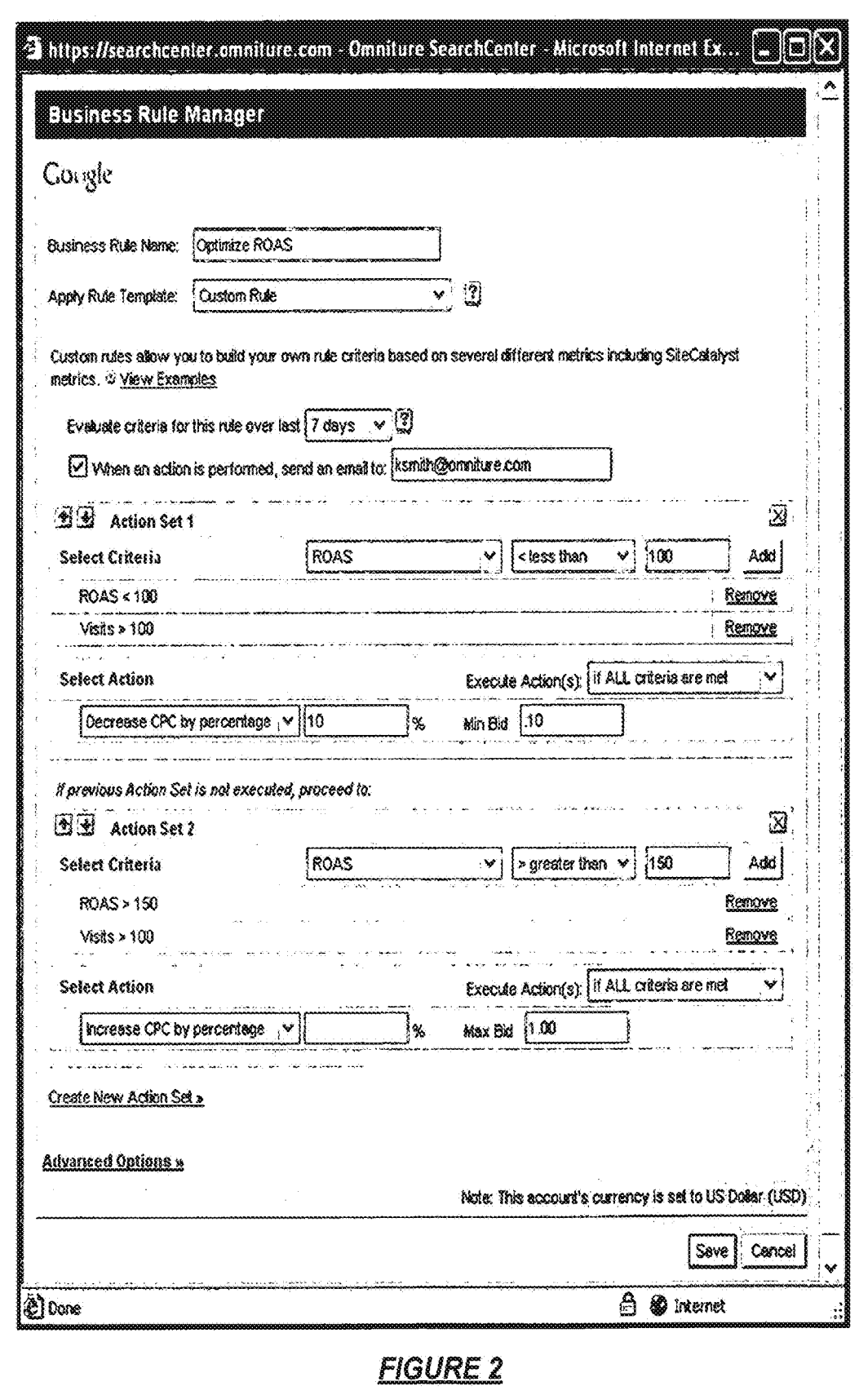

Referring now to the user interface shown in FIG. 2, there is a field for allowing the user or business entity to enter a custom name for the rule. Further, there is an option for notifying the user or business entity whenever the rule is triggered. Notification may occur via e-mail, or in one or more other embodiments, how often and when the rule is triggered may be maintained on a website perusable by the user or business entity.

Still referring to the user interface shown in FIG. 2, a pull-down box is accessible to allow a selection for how many of the set parameters have to be met in order for the rule to be triggered. For example, the displayed selection in FIG. 2 indicates that all of the set conditions must be met in order for the rule to be triggered. However, in other situations, a user or business entity may decide that the rule should be triggered whenever at least one of the set conditions is met.

If and when the customized rule is triggered, art action follows, and the user or business entity may have customized the course of action to be taken in response to a rule being triggered. For example, a selection may be that when the rule is triggered (described above), the maximum cost-per-click (CPC) is increased by a factor of 3 up to a maximum of $4.99. Other options may include disabling the keyword if the rule is triggered and/or simply not changing the bid. Once the desired rule trigger and action have been set, the user or business entity may save the rule to a rule library.

In one or more embodiments, a user interface may be provided for comparing web traffic to the custom rules used to bid on keywords. For example, a bid automation tool in accordance with one or more embodiments may interface with a bid management system (e.g., SearchCenter by Omniture, Inc.). Further, the bid management system may in turn be operatively connected to a web analytics tool (e.g., SiteCatalyst by Omniture, Inc.) and an Internet search engine such as one provided by Google, Inc., Microsoft Corporation, or Yahoo! Inc. Those skilled in the art will note that ability of one or more embodiments to provide customizable rules for bidding on keywords as well as communicating with the web analytics tool for a real comparison to web traffic may provide validation of the custom created rules.

The addition of a bid management system to a bid automation tool allows users or business entities to create, define, and maintain rules that trigger specific actions when particular events occur. The rule variables and actions are relevant to a particular search engine, although in one or more other embodiments, the rule variables and actions may apply to more than one search engine.

The user or business entity is able to group these rules into a bidding strategy, which, in one or more embodiments, is a rule for weekdays, weekends, and special events. A current bidding strategy may be displayed on a "manage keywords/campaigns/ads groups" page. By selecting the current strategy, the user or business entity is taken to a main page, and from this page, the user or business entity may change the strategy for the keyword that they are currently viewing, edit or create new strategies, add special events, and/or create custom rules via a rule library (described below). Once the strategies and rules have been defined, a backend, or running, process may periodically check to see if a rule is triggered. When a rule is triggered, the corresponding action(s) associated with the rule may be performed by the backend process.

In one or more embodiments, a bidding strategy includes a collection of rules that define a user's desired bidding methodology used for a keyword or collection of keywords. When a user requests to customize a bidding rule, a customization user interface, such as that shown in FIG. 2, may be presented to the user. The user interface generally has, for example, an email option, user defined criteria, user defined action, and whether all or any criteria need to be met in order for the bidding rule to be triggered.

Further, in one or more embodiments, the user interface shown n FIG. 2 allows for the ability to enter multiple criteria/action blocks called "action sets". In other words, a user can craft a bidding rule according to such a paradigm: "if my keyword is performing well, lets do this; however, if this keyword is not performing well, lets do this instead". Further, the user may add unlimited action sets to a custom rule. The action sets may be evaluated from the top down, and evaluation may stop as soon as the criteria for an action set is met. In other words, if the first action set's criteria is met, the action for that action set is fired, and the second action set is not even evaluated—i.e., they are mutually exclusive. Those skilled in the art will note that such a feature provides increased flexibility of custom bidding rules. As another example, a user may enter their own position rule by entering 4 or more actions sets in this manner: "If my position is way too high (I want 3 and I am currently 20), adjust my CPC by a lot"; "If my position is just a little high, increase my CPC a little; "If my position is way to low (I want 10, but am currently being placed #1), decrease my CPC by a lot; otherwise if I am only a position or two away, decrease my CPC by just a little."

Further, still referring to the user interface shown in FIG. 2, there is a time frame drop-down. This tells the user over what period of type to evaluate the criteria of a custom rule. For instance, if your criteria is "clicks>1000" and your timeframe is 3 days, that means you must have received at least 1000 clicks over the last 3 days for that criterion to be met.

Further, in one or more embodiments, there are various courses of action that may be performed when a rule event is triggered. For example, the user may specify a mathematical operation to be performed on the max CPC. The configurable operand may be specified through a text box, and the operator may be selectable via a drop-down list that includes one or more of the following: multiple CPC by; increment CPC by; decrement CPC by; and set CPC to. Those skilled in the art will note that this list may be different for different search engines. Further, for this option, a max CPC may be entered that represents the most the user is willing to spend on the keywords associated with this rule. This field may be left empty if no max is desired. In another example, the user may disable the keyword such that keywords associated with this keyword, group, or campaign will be disabled for advertising with the specified search engine. In another example, the user may select that there be no automated changed to the CPC or the keywords/campaign/group. This option may exist for users who simply want to be notified of events through e-mail.

Additionally, in one or more embodiments, performance based rules may be created based on a series of conditionals for various variables. The rule may be defined by creating one or more conditional rows for the rule. A conditional row may include a variable, an operator, and a value. Each of these elements to the conditional row may be selected from a drop-down list. A list of variables may include, but not limited to: average position for the search engine; number of impressions the search engine reports; total cost of advertisement for the keyword, group, or campaign; cost per click (CPC) for the keyword, group or campaign; the current maximum CPC; return on ad spend; click through rate; and calculated metrics. Operators may include, but are not limited to: a "greater than" operation; a "less than" operation; and an "equal to" operation. Further, as described above with reference to FIG. 2, the user or business entity may select that all rules need to be met before the action is performed or may indicate that the action can be performed as soon as any of the conditions are met.

Now referring to FIG. 3, the shown business rules manager user interface allows the user to add new, edit, or delete, as well as showing the user how many keywords currently have each rule assigned to them. In one or more embodiments, they may be organized by search engine. Further, in one or more other embodiments, the user may copy a business rule into a different search engine's list.

Figure 4:
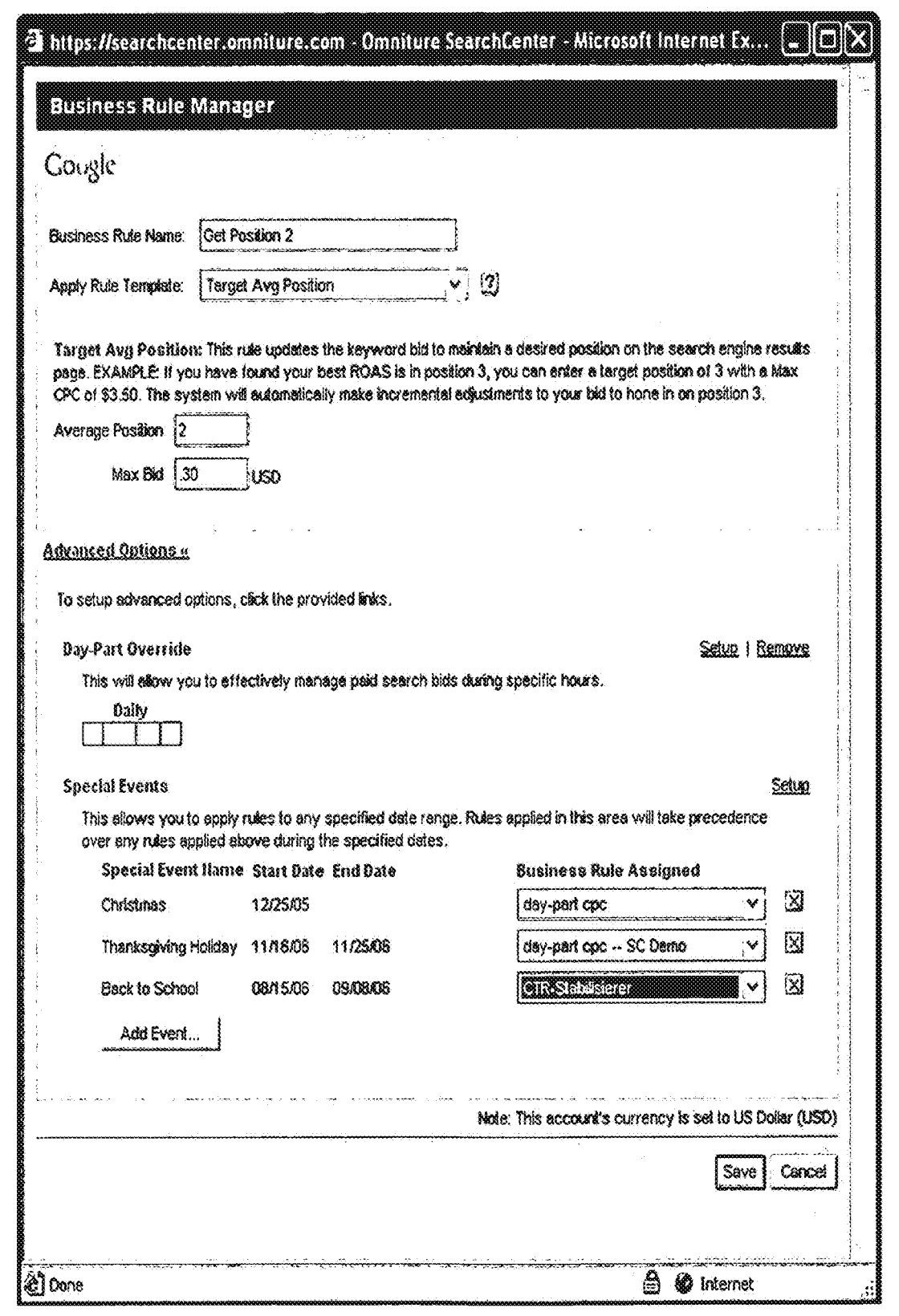
Figure 8:
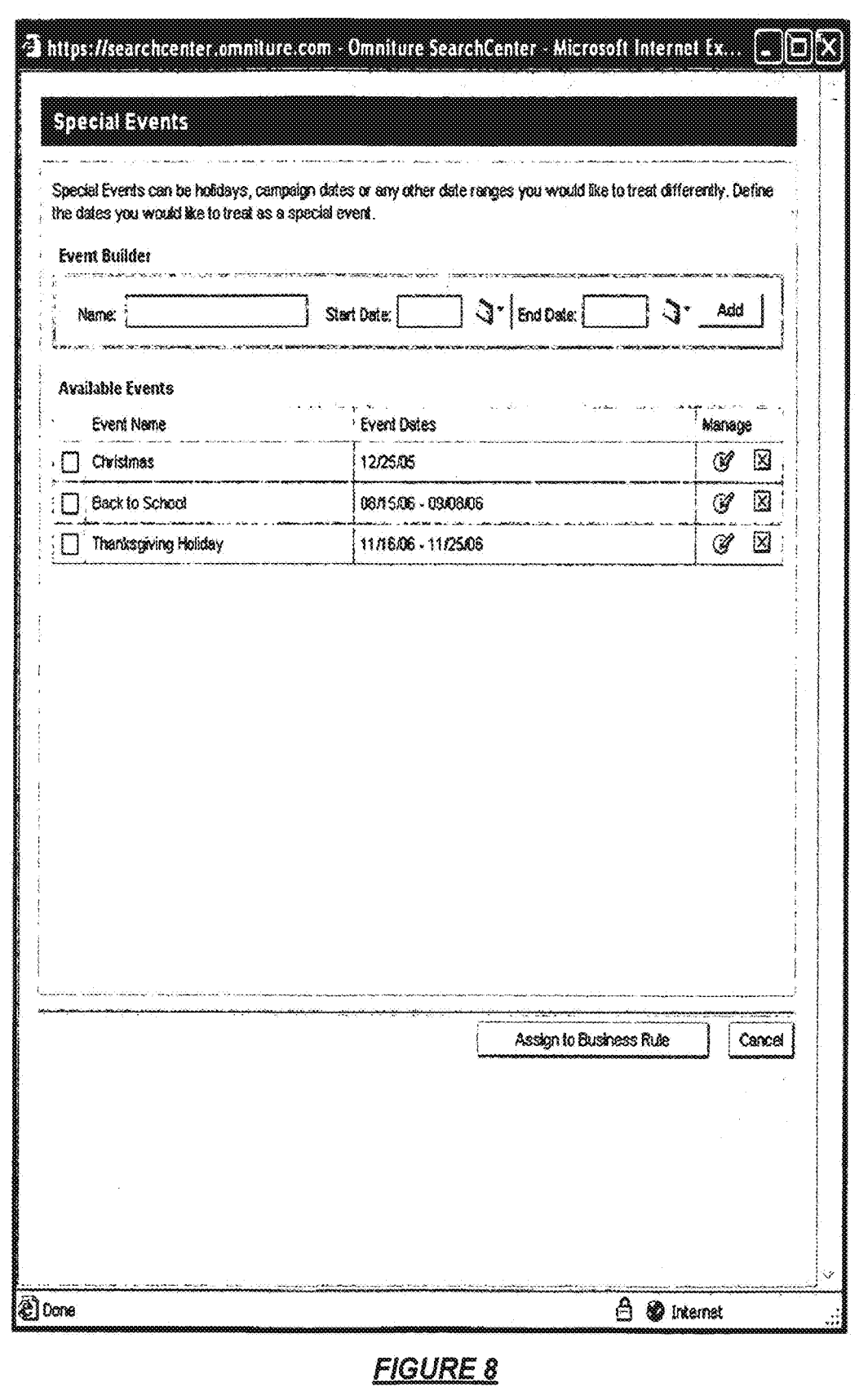

FIG. 4 shows a predefined rule with the advanced options open. In the advanced options, there are day parts and special events. As shown in FIG. 8 below, a user interface for special events shows the name of the event, the dates, and a drop-down from which the user can choose a business rule that the user has already created. This may be the same list as what is on the business rules manager user interface shown in FIG. 3. The day parts section allows the user to enter the custom day part builder and shows a graphical summary of the user's daily dayparts.

Figure 5:
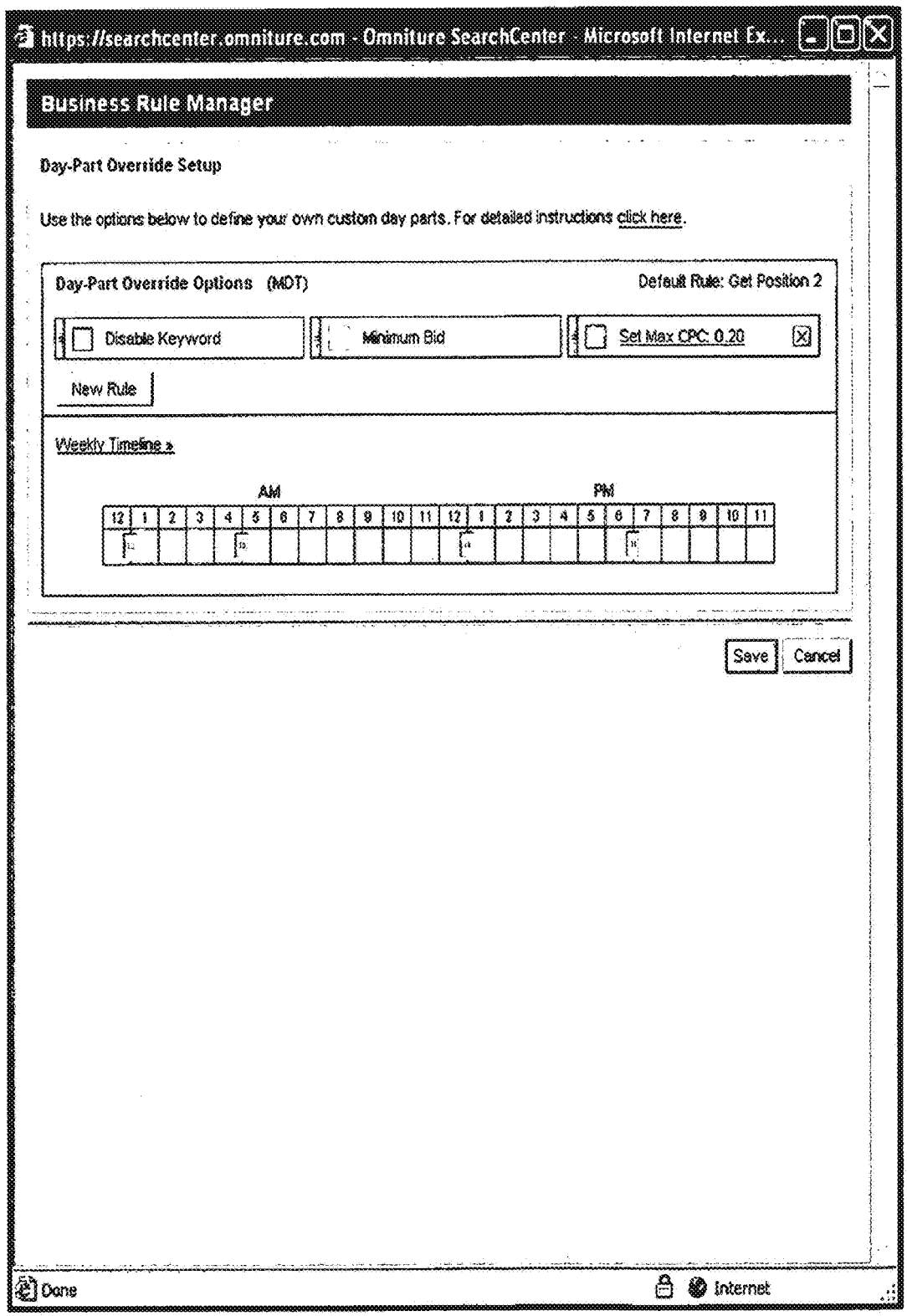
FIG. 5 shows a business rule manager user interface in accordance with an embodiment of the present invention.

FIG. 5 shows a custom day part builder. A legend at the top has available rules that the user may put into day parts. The user may click the new rule button to add additional rules to this list. Below there is a representation of the 24 hours of the day. The user may drag rules from the legend into an hour to create a day part. The user may then expand or decrease the day part by dragging the handles. This example shows that the default rule of "Get Position 2" (set up on a previous page) (set up on the previous page) will run from 12:00 midnight until 1:00 am. From 1:00 am until 5:00 am, the keyword will be disabled, and from 5:00 to 1:00 pm, the keyword will have its CPC set to the minimum bid allowed by the search engine. From then until 7:00 pm, the CPC will be set to $0.20, after which the default rule will run until the end of the day. This pattern may be followed daily.

Figure 6:
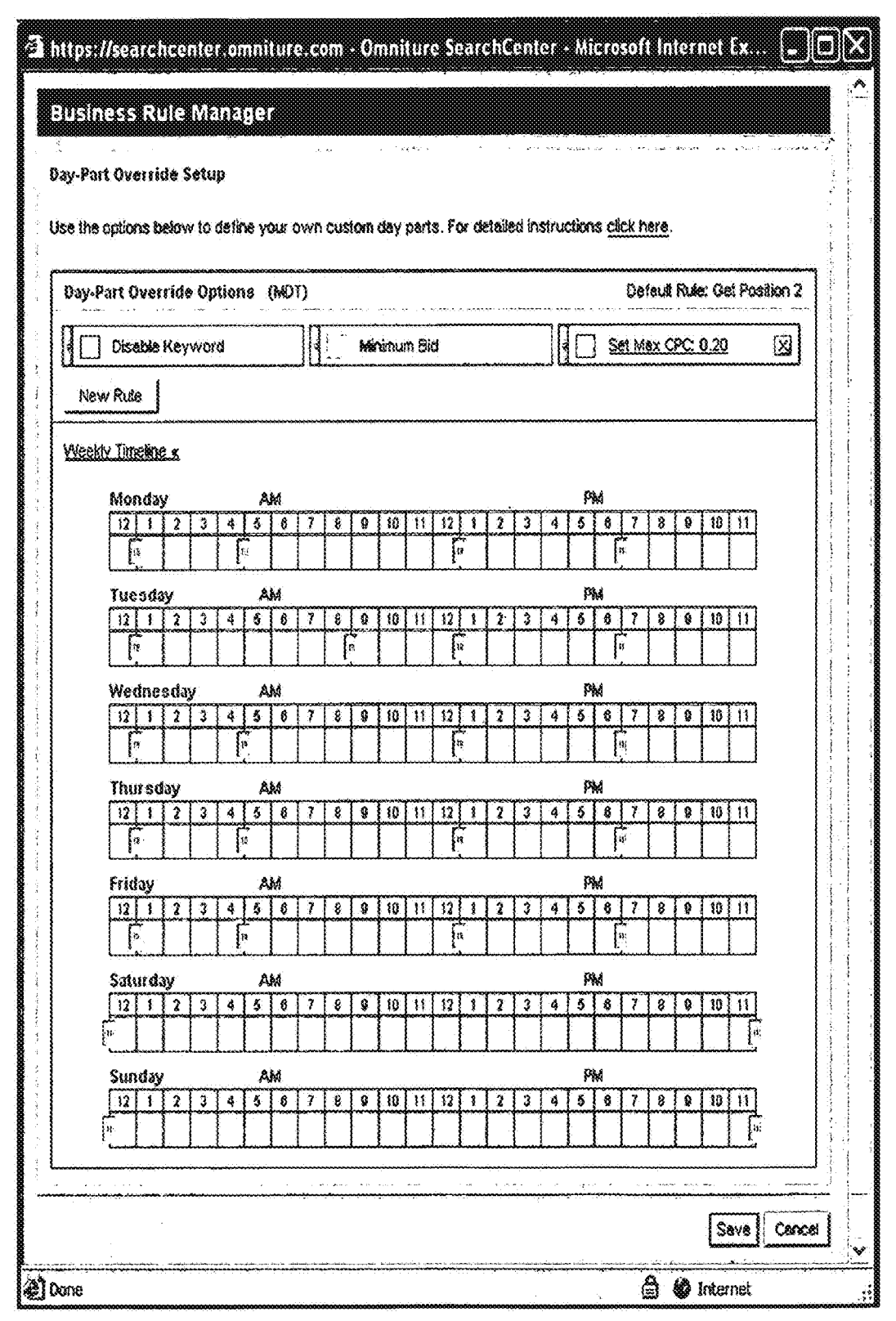
Figure 7:
FIG. 7 shows a business rule manager user interface in accordance with an embodiment of the present invention.

FIG. 6 shows that the user may treat each day of the week differently. In this example, all weekdays, except Tuesday, are treated the same, however, on the weekends, the keywords will be disabled (there are many companies that do not want to advertise on the weekends). The user may also set this up so that he/she only advertises during normal business hours. FIG. 7 shows an example of what a day part summary may look like when defining each day of the seek separately.

FIG. 8 shows a special events user interface. This user interface shows the name of the event, the dates, and a drop-down from which the user can choose a business rule that the user has already created. In one or more embodiments, a report suite may have a global collection of special events. These are days that a user or business entity may want to treat differently. For example, advertising gets expensive over the Christmas holidays, so the user may wish to disable some ad groups during that time period. By selecting an add events option, the user may select which of the special events should apply to this strategy. Further, the user may choose and/or customize a different rule for each special event.

Figure 9:
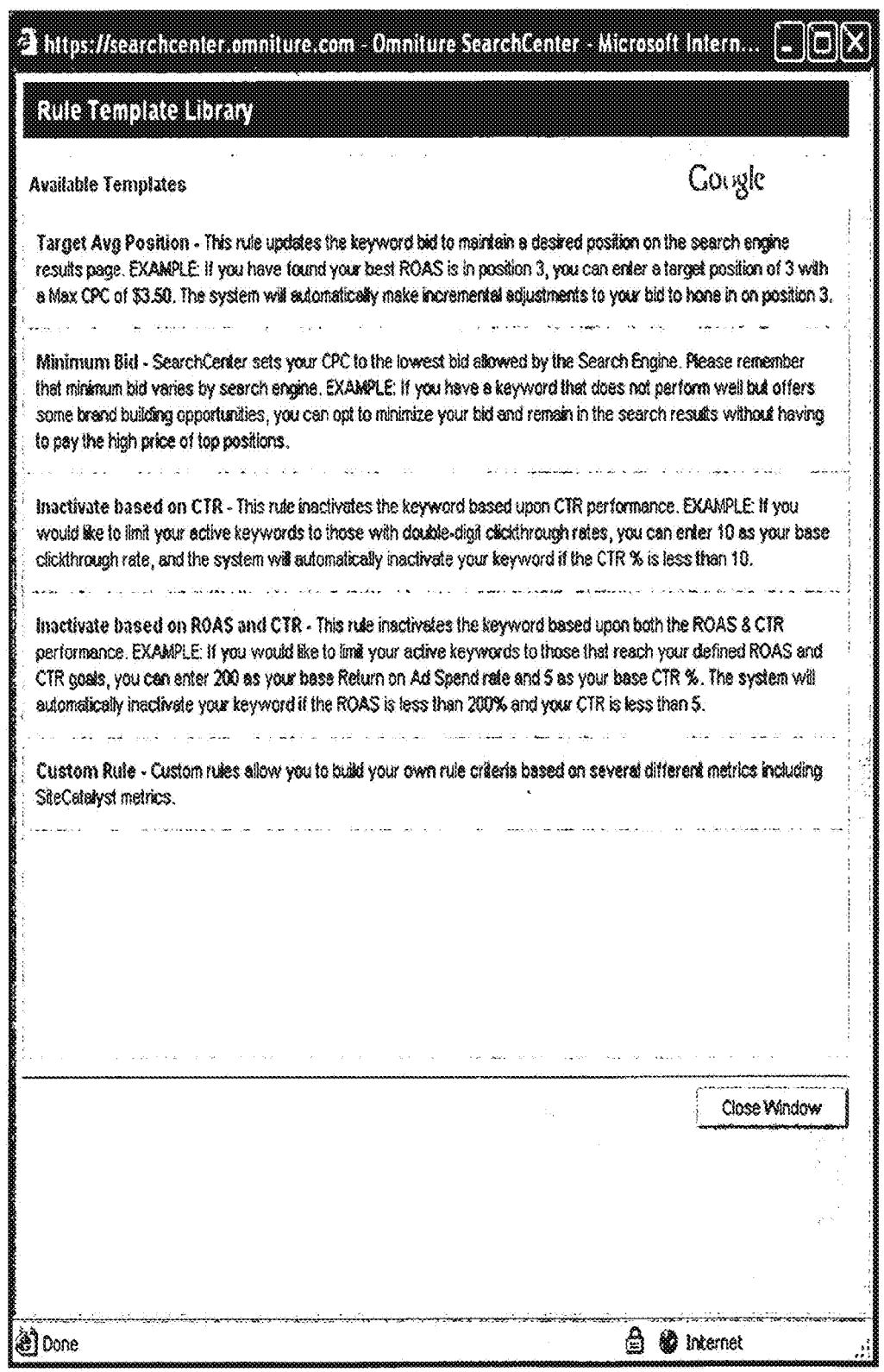
FIG. 9 shows a rule template library window in accordance with an embodiment of the present invention.

FIG. 9 shows a rule template library user interface, which provides a definition of the custom rule template.

Figure 10:
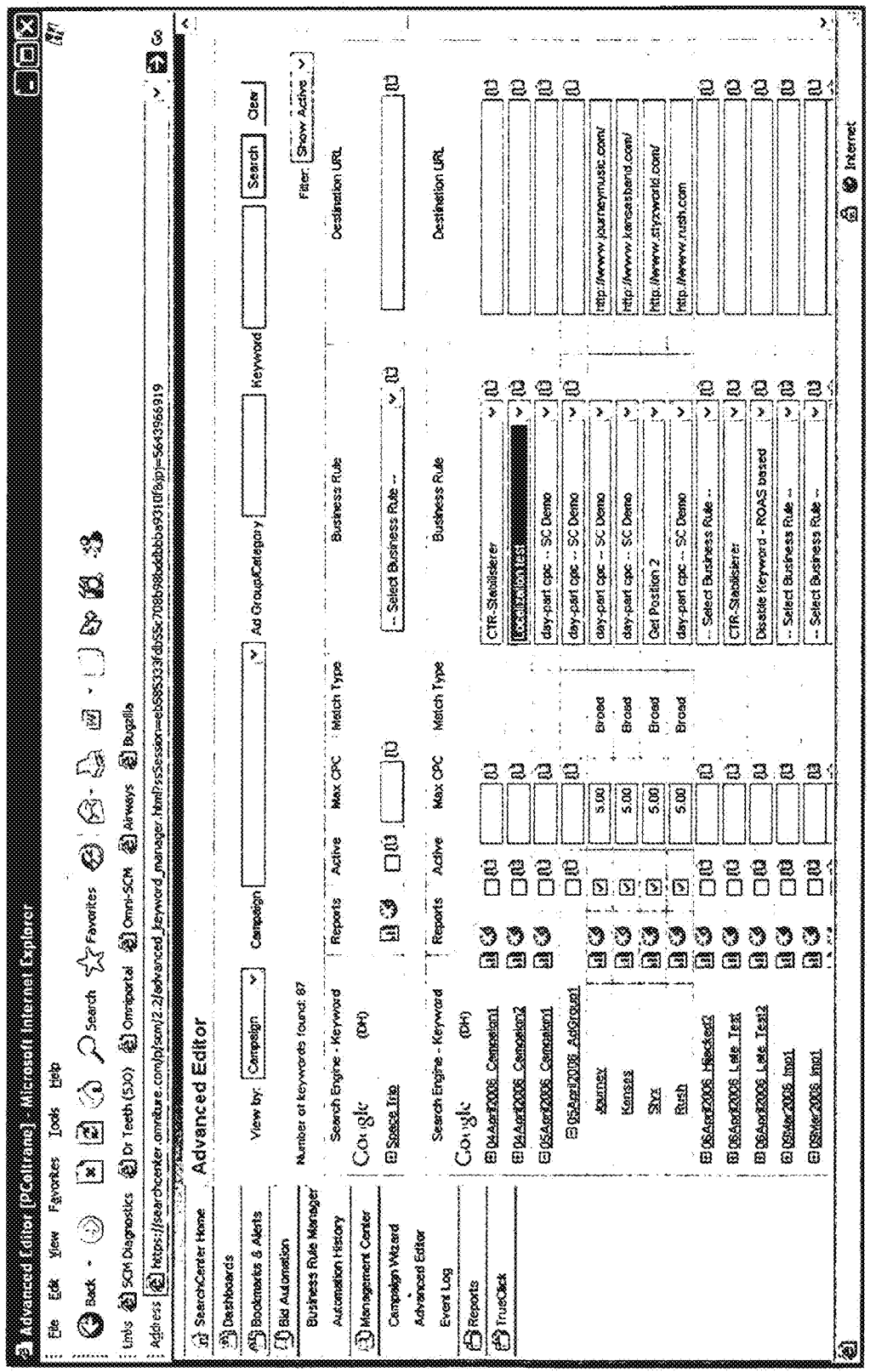
FIG. 10 shows an advanced editor page in accordance with an embodiment of the present invention.

FIG. 10 shows a screenshot of an advanced editor page in accordance with an embodiment of the present invention. This page allows the user to assign business rules to keywords. The user may do such at the campaign level, ad group level, and/or keyword level. The interface shows all of the user's campaigns. Clicking the "+" next to the campaigns shows the ad groups in that campaign. Clicking on the "+" next to ad groups shows the keywords in that ad group. If the user enters a business rule on the campaign level and clicks on the clipboard/arrow icon next to it, it will apply that rule to every keyword in every ad group in that campaign. The user may do the same thing on the ad group row and on the keyword row.

Figure 11:
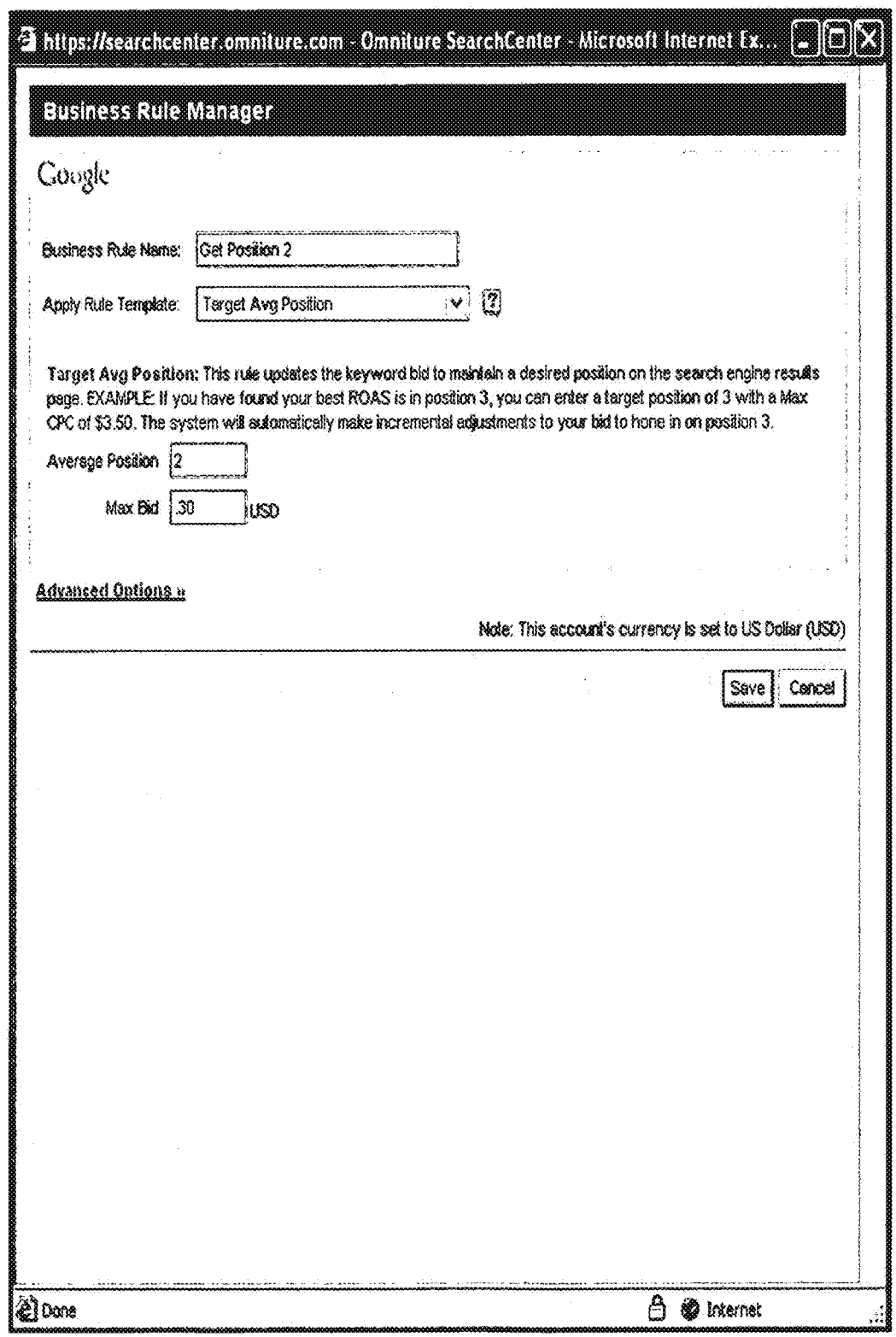
FIG. 11 shows a business rules manager user interface in accordance with an embodiment of the present invention.

FIG. 11 shows a business rule edit/create page in accordance with an embodiment of the present invention. The user may name a business rule and then select from the drop-down which rule template the user wants to use. This is an example of a predefined rule template where the user enters the position he/she wants and how much he/she is willing to pay to obtain that position, whereupon the bid automation tool adjusts the user's bid to get closer that position. Further, those skilled in the art will note the advanced options link at the bottom. This is where the day parts and special events described above may reside.

Although custom rules are a good differentiator, many user's or business entity's needs may be meet with predefined rules. These rules may vary dependent on the type of search engine being used. Example of predefined rules include, but are not limited to: maintaining a specific position intelligently by raising and lowering the max CPC up until a user-specified CPC max; setting the CPC to 1 percent less than a competitor's max bid value; setting the CPC to be within the first bid group inside a set of conditions (where a bid gap may be defined as any CPC where the competitive bids have a difference greater than 1 percent); setting the CPC to be within the largest bid gap inside a set of conditions; setting the CPC to be 1 percent above or 1 percent below a specified competitive URL; setting the CPC to be 1 percent below a lower competitor when get within a configurable range of your highest bid; moving position to a configurable position when the cost is less than or equal to a configurable amount; adjusting the keyword bid if the price difference exceeds a specified amount; setting the CPC to the minimum allowed by the search engine; and allowing retrieval of a bid price (e.g., sent through an alert) without taking any action on the CPC or position.

Further, in one or more embodiments, a log may be kept of every change to a bid, both manual and automatic, and every rule that gets executed on a keyword. This report allows the user to filter by such things as the keyword, ad group, campaign, the search engine, the rule, etc.

As described above, a bid automation tool in accordance with one or more embodiments has access to third party search engine information. Those skilled in the art will note that some data provided by all search engines may be classified as the same, but every search engine has their own specifics that only apply to that search engine. Access to and parsing of data from the third party search engines is required for the system to operate as designed. How frequently rules are checked and the granularity of reports may vary depending on the timeliness of the data retrieved from the third party search engines.

The execution of rules may happen in a background process that reads the rules, reads the metric data collected from the third party search engines and the bid management system, and then executes the rule if it fits the criteria. Further, in one or more embodiments, rule execution may rely on an e-mail server and third party search engine application program interfaces (APIs) in order to perform properly.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and analysis and processing techniques and mechanisms may be used, and that the present invention can be implemented using mechanisms other than those described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method for automated bidding on keywords used in an Internet advertising campaign, the method comprising:
    storing, in a library of customized bidding rules in a storage device of a computing device, a rule comprising a keyword condition that triggers an action to be taken, the keyword condition including a variable, an operator, and a value, the action including automatically bidding on a keyword associated with the rule;
    customizing, by a bid automation tool, the rule in the storage device to modify subsequent keyword purchasing to increase web traffic driven to a web site as a result of keyword purchasing, the customizing being based on metrics received from one or more search engines, the metrics being calculated based on visitor interactions with the website, and web traffic data received from a web analytics tool indicating the web traffic driven to the website as a result of the keyword purchasing;
    determining whether the keyword condition has been met for the customized rule based on the metrics and comparing a measure of the web traffic data corresponding to the variable to the value and the operator of the keyword condition; and
    executing, by the computing device, the action to be taken when the rule is triggered responsive to determining that the keyword condition has been met.

2. The computer-implemented method of claim 1, wherein the action comprises adjusting a cost-per-click (CPC) parameter.

3. The computer-implemented method of claim 1, wherein the action results in automatically bidding on the keyword according to a predefined selection.

4. The computer-implemented method of claim 1, further comprising parsing the web traffic data for determining whether the keyword condition has been met.

5. The computer-implemented method of claim 1, further comprising interfacing with the one or more search engines, separately from an interface with the web analytics tool, to receive the metrics from the one or more search engines.

6. The computer-implemented method of claim 1, further comprising providing a user interface enabling a user to define the library of customized bidding rules.

7. The computer-implemented method of claim 1, wherein modifying the rule comprises disabling the keyword.

8. The computer-implemented method of claim 1, wherein modifying the rule comprises an iterative process.

9. The computer-implemented method of claim 1, wherein the rule depends on a conditional variable associated with the web traffic data.

10. A bid management system for customized bidding on keywords used in an Internet advertising campaign, the system comprising:
    a bid automation tool configured to:
        store a rule in a library of customized bidding rules in a storage device, the rule comprising a keyword condition that triggers an action to be taken, the keyword condition including a variable, an operator, and a value, the action including automatically bidding on a keyword associated with the rule;
        compare a measure of web traffic data corresponding to the variable to the value and the operator of the keyword condition to determine if the keyword condition is met; and
        in response to determining that the keyword condition is met, execute the action; and
    a web analytics tool operatively connected to the bid automation tool, the web analytics tool being configured to provide the web traffic data and web analytics data to the bid automation tool;
    wherein the bid automation tool is further configured to:
        customize the rule in the storage device to modify subsequent keyword purchasing to increase web traffic driven to a web site as a result of keyword purchasing, wherein customizing the rule is based on metrics received from one or more search engines, the metrics being calculated based on user interactions with the website, and the web traffic data indicating the web traffic driven to the website as a result of the keyword purchasing; and
        determine whether the keyword condition has been met for the customized rule based on the metrics and comparing a measure of the web traffic data corresponding to the variable to the value and the operator of the keyword condition.

11. The system according to claim 10, wherein the bid automation tool interfaces with the one or more search engines, separately from an interface with the web analytics tool, to receive the metrics from the one or more search engines.

12. The system according to claim 10, wherein user-specified bidding associations for the rule relate to adjusting a cost-per-click (CPC) parameter.

13. The system according to claim 10, wherein the action results in automatically bidding on the keyword according to a predefined selection.

14. The system according to claim 10, wherein the bid automation tool is further configured to:
    receive the metrics from the one or more search engines; and
    parse the metrics for determining whether the keyword condition has been met.

15. The system according to claim 10, wherein the bid automation tool interfaces with the one or more search engines, separately from an interface with the web analytics tool, to receive the metrics from the one or more search engines.

16. The system according to claim 10, further comprising providing a user interface enabling a user to define the library of customized bidding rules.

17. A non-transitory computer-readable medium having instructions stored thereon, that when executed by a processor, cause the processor to:
   store a rule in a library of customized bidding rules in a storage device, wherein the rule comprises a keyword condition that triggers an action to be taken, wherein the action includes automatically bidding on a keyword associated with the rule;
   interface with a web analytics tool to receive web analytics data;
   customize the rule in the storage device to modify subsequent keyword purchasing to increase web traffic driven to a website as a result of keyword purchasing, wherein customizing the rule is based on metrics received from one or more search engines, the metrics being calculated based on visitor interactions with the website, and web traffic data received from the web analytics tool indicating the web traffic driven to the website as a result of the keyword purchasing;
   determine whether the keyword condition has been met for the customized rule based on the metrics and comparing a measure of the web traffic data corresponding to a variable to a value and an operator of the keyword condition; and
   execute the action to be taken when the rule is triggered responsive to determining that the keyword condition has been met.

18. The computer-readable medium of claim 17, wherein the action comprises adjusting a cost-per-click (CPC) parameter.

19. The computer-readable medium of claim 17, wherein the action results in automatically bidding on the keyword according to a predefined selection.

20. The computer-readable medium of claim 17, further comprising instructions, that when executed by the processor, cause the processor to:
   receive the metrics from the one or more search engines; and
   parse the metrics for determining whether the keyword condition has been met, the parsing being based on formatting of the metrics specific to the one or more search engines.

21. The computer-readable medium of claim 17, further comprising instructions, that when executed by the processor, cause the processor to:
   determine the measure of the web traffic data based on the metrics, wherein the web traffic was generated as a result of one or more advertisements, and wherein the advertisements were served at least in part as a result of previous bidding on the keyword;
   compare the measure of the web traffic data to a plurality of keyword conditions to determine if the keyword conditions are met; and
   execute the action defined in the rule responsive to the keyword conditions being met.

* * * * *